United States Patent

Enomoto et al.

[11] Patent Number: 5,158,823
[45] Date of Patent: Oct. 27, 1992

[54] SECOND HARMONIC WAVE GENERATING DEVICE

[75] Inventors: Ryo Enomoto; Masaya Yamada, both of Gifu, Japan

[73] Assignee: Ibide Co., Ltd., Ogaki, Japan

[21] Appl. No.: 719,630

[22] Filed: Jun. 24, 1991

[30] Foreign Application Priority Data

Jun. 22, 1990 [JP] Japan .................................. 2-162828

[51] Int. Cl.$^5$ ................................................ G02F 1/37
[52] U.S. Cl. .................................... 428/216; 359/326; 359/328; 359/332; 385/122; 428/212; 428/697; 428/701; 428/702
[58] Field of Search ............... 428/699, 688, 689, 697, 428/701, 702, 472, 212, 216, 913; 359/326, 328, 332; 385/122

[56] References Cited

U.S. PATENT DOCUMENTS

| | | | |
|---|---|---|---|
| 4,951,293 | 8/1990 | Yamamoto et al. | 359/332 |
| 4,953,943 | 9/1990 | Miyazaki et al. | 385/122 |
| 4,973,118 | 11/1990 | Enomoto et al. | 359/332 |

FOREIGN PATENT DOCUMENTS

| | | |
|---|---|---|
| 0432390 | 9/1990 | European Pat. Off. |
| 2-12135 | 1/1990 | Japan |

Primary Examiner—Ellis P. Robinson
Assistant Examiner—Archene Turner
Attorney, Agent, or Firm—Sherman and Shalloway

[57] ABSTRACT

A second harmonic wave generating device comprises a $LiTaO_3$ thin film formed on a $LiNbO_3$ substrate and a $LiNbO_3$ thin film waveguide layer formed in the $LiTaO_3$ thin film. The thickness ($T(\mu m)$) of the $LiNbO_3$ thin film waveguide layer, an ordinary refractive index ($\eta_{oS1}$) of the $LiTaO_3$ thin film at a fundamental wavelength ($\lambda(\mu m)$), an ordinary refractive index ($\eta_{oF1}$) of the $LiNbO_3$ thin film waveguide layer at the fundamental wavelength ($\lambda(\mu m)$), an extraordinary refractive index ($\eta_{eS2}$) of the $LiTaO_3$ thin film at a second harmonic wavelength ($\lambda/2$, ($\mu m$)) and an extraordinary refractive index ($\eta_{eF2}$) of the $LiNbO_3$ thin film waveguide layer at the second harmonic wavelength ($\lambda/2$, ($\mu m$)) are individually within the following specific values:

$\lambda = 0.68$ to $0.94$ $\mu m$
$T = 0.1$ to $20$ $\mu m$
$\eta_{oF1} = 2.22$ to $2.38$
$\eta_{oS1} = 2.10$ to $2.25$
$\eta_{eF2} = 2.24$ to $2.42$
$\eta_{eS2} = 2.22$ to $2.38$.

12 Claims, 1 Drawing Sheet

SECOND HARMONIC WAVE GENERATING DEVICE

BACKGROUND OF THE INVENTION

This invention relates to a second harmonic wave generating device having an extremely high conversion efficiency to second harmonic wave, more specifically, to a second harmonic wave generating device (hereinafter referred to as "SHG device") comprising a $LiNbO_3$ thin film waveguide layer formed on a $LiTaO_3$ thin film which is formed on a $LiNbO_3$ substrate.

A SHG device utilizes nonlinear optical effects of a nonlinear optical material to convert wavelength λ of incident laser light to wavelength ½λ, which is outputted. Since the output light has ½ the wavelength of incident light, the device can be used in an optical disc memory and CD player to achieve a 4-times increase in recording density, and can be used in a laser printer and photolithography with enhanced resolution.

Heretofore, a bulk single crystal of a nonlinear optical material using a high-output-power gas laser as a light source has been used as a SHG device. However, with recent increases in demand for compact optical disc systems and laser printers and since gas laser requires an external modulator for optical modulation and is not suited for compact design, a SHG device that enables and use of a semiconductor laser, which can be directly modulated and is lower in cost and easier to handle than gas laser, has been in demand. When a semiconductor laser is used as a light source, since the semiconductor laser generally has a low output power of several mW to several ten mW, a SHG device of a thin film waveguide structure which has a particularly high conversion efficiency has been required.

Optical materials that have nonlinear optical effects and can be used in a SHG device include lithium niobate ($LiNbO_3$), lithium tantalate ($LiTaO_3$), $KTiOPO_4$, $KNbO_3$, $Ba_2NaNb_5O_{15}$, and $Ba_2LiNb_5O_{15}$ and, among these, $LiNbO_3$ is high in nonlinear optical constant and low in optical loss, which makes it most suitable for use in a SHG device.

Heretofore, there have been known methods to form an optical waveguide using $LiNbO_3$, in which a bulk single crystal of $LiNbO_3$ is treated by Ti diffusion, proton exchange, or out-diffusion to form layers with different refractive indices. However, waveguides obtained using these methods have problems in that it is difficult to have great differences in refractive index from the bulk crystal (with respect to short wavelength laser light especially not more than 1 μm in wavelength). It is extremely difficult to make phase matching for the generation of the second harmonic wave, that is, to conform the refractive index in the waveguide (effective index) of incident light to the effective index of the second harmonic wave [Yamada and Miyazaki, Technical Report of the Electronic Information Communication Society, MW87-113 (1988)], and is difficult to obtain a high conversion efficiency because, since the boundary between the waveguide and the bulk crystal is not well defined, the light wave tends to diffuse from the waveguide and it is thus difficult to concentrate the optical energy.

The inventors, using a $LiNbO_3$ material and a 0.8 μm-band semiconductor laser light source, have conducted investigations for a combination that enables phase matching between the fundamental light wave and the second harmonic wave, and found a condition that enables phase matching using a structure comprising a $LiTaO_3$ single crystal having a specific refractive index and a $LiNbO_3$ thin film as a waveguide layer having a specific refractive index formed on the surface of the $LiTaO_3$ single crystal, thus accomplishing a previous invention, which was applied for a patent as Japanese Patent Application No.63-160804/1988.

However, the previous invention was of a type with a very narrow range of application which was able to use only a 0.8 μm-band semiconductor laser as a fundamental laser light source. Furthermore, since refractive index of a substance generally varies with wavelength of light applied, the previous invention was difficult to be applied to laser light sources of different wavelengths, and in prior invention $LiNbO_3$ thin film is directly formed on $LiTaO_3$ substrate.

Commercial $LiTaO_3$ single crystal substrates used as carriers for single crystal thin films are for use in SAW devices, which are high in impurity content (>2 ppm), large in refractive index distribution ($10^{-3}$/cm), and inferior in crystallinity. Therefore, when used as substrates for optical thin films, since thin film waveguide layer formed on the substrates transfers the crystallinity of the substrate, these substrates tend to cause defects such as domains, which lead to deterioration in characteristics such as optical transmission, electrooptical effect and nonlinear optical effects.

Furthermore, although it is possible to use an optical-grade $LiTaO_3$ substrate, optical-grade single crystal substrates are very little commercialized except for $LiNbO_3$, are thus expensive, and not suitable for general-purpose use.

The inventors have conducted intensive studies using a $LiNbO_3$ material in a SHG device which enables phase matching with laser light sources of different wavelengths. As a result, it has been found that a second harmonic wave can be generated very efficiently by using a substrate comprising a $LiTaO_3$ thin film formed on a $LiNbO_3$ substrate, forming a $LiNbO_3$ thin film waveguide layer on the $LiTaO_3$ thin film, setting a fundamental wavelength (λμm), a thickness (Tμm) of the thin film waveguide layer, an ordinary refractive index ($n_{OS1}$) of the substrate at the fundamental wavelength (λμm), an ordinary refractive index ($n_{OF1}$) of the thin film waveguide layer at the fundamental wavelength (λμm), an extraordinary refractive index ($n_{eS2}$) of the substrate at a second harmonic wavelength (λμm/2), and an extraordinary refractive index ($n_{eF2}$) of the thin film waveguide layer at the second harmonic wavelength (λμm/2) within specific ranges, thus accomplishing the present invention.

SUMMARY OF THE INVENTION

In accordance with the present invention, there is provided a second harmonic wave generating device comprising a $LiTaO_3$ thin film formed on a $LiNbO_3$ substrate and a $LiNbO_3$ thin film waveguide layer formed on the $LiTaO_3$ thin film, a fundamental laser wavelength (λμm), a thickness (Tμm) of the $LiNbO_3$Sr-thinfilm waveguide layer, an ordinary refractive index ($n_{OS1}$) of the $LiTaO_3$ thin film at the fundamental wavelength (λμm), an ordinary refractive index ($n_{OF1}$) of the $LiNbO_3$ thin film waveguide layer at the fundamental wavelength (λμm), an extraordinary refractive index ($n_{eS2}$) of the $LiTaO_3$ thin film at a second harmonic wavelength (λμm/2), and an extraordinary refractive index ($n_{eF2}$) of the $LiNbO_3$ thin film waveguide layer at the second harmonic wavelength ($\lambda \mu m/2$) being individually within the following specific values:

$\lambda = 0.68$ to $0.94$ $\mu m$
$T = 0.1$ to $20$ $\mu m$
$n_{OF1} = 2.22$ to $2.38$
$n_{OS1} = 2.10$ to $2.25$
$n_{eF2} = 2.24$ to $2.42$
$n_{eS2} = 2.22$ to $2.38$ There is also provided according to the present invention a method for producing a second harmonic wave generating device comprising the following steps (a) and (b):

(a) forming a LiNbO$_3$ thin film waveguide layer on a LiTaO$_3$ substrate, and adjusting a fundamental laser wavelength ($\lambda \mu m$), an ordinary refractive index ($n_{OS1}$) of the LiTaO$_3$ substrate at the fundamental wavelength ($\lambda \mu m$), an ordinary refractive index ($n_{OF1}$) of the LiNbO$_3$ thin film waveguide layer at the fundamental wavelength ($\lambda \mu m$), an extraordinary refractive index ($n_{eS2}$) of the LiTaO$_3$ substrate at a second harmonic wavelength ($\lambda \mu m/2$), and an extraordinary refractive index ($n_{eF2}$) of the LiNbO$_3$ thin film waveguide layer at the second harmonic wavelength ($\lambda \mu m/2$) individually within the following specific values:

$\lambda = 0.68$ to $0.94$ $\mu m$
$n_{OF1} = 2.22$ to $2.38$
$n_{OS1} = 2.10$ to $2.25$
$n_{eF2} = 2.24$ to $2.42$
$n_{eS2} = 2.22$ to $2.38$ (b) dry etching the LiNbO$_3$ thin film waveguide layer to adjust the thickness (T $\mu m$) of the waveguide to 0.1 to 20 $\mu m$.

DETAILED DESCRIPTION OF THE INVENTION

The SHG device according to the present invention is required to have a structure in which a LiTaO$_3$ thin film is formed on a LiNbO$_3$, and a LiNbO$_3$ thin film waveguide layer is formed on the LiTaO$_3$ thin film.

The reason why the SHG device requires a thin film waveguide layer is that generation of a second harmonic wave in a SHG device comprising a thin film waveguide layer formed on a substrate has the advantages that optical energy concentrated in the thin film can be utilized, and, since the light wave is confined within the thin film and does not diffuse, interaction can be made over a long distance, and phase matching becomes possible by making use of mode dispersion of the thin film using a substance which is not able to make phase matching when used in a SHG device using its bulk material.

The reason why LiNbO$_3$ is used as the thin film waveguide layer of the present invention is that LiNbO$_3$ is large in nonlinear optical constant, is small in optical loss, and can be formed into a uniform film.

The reason why LiNbO$_3$ is used as the substrate is that this kind of substrate is easily commercially available, is resistant to mechanical and thermal shocks, and thus has almost no danger of breakage during the thin film formation process.

Furthermore, the LiTaO$_3$ and LiNbO$_3$ are similar in crystal structure, and easy to form a thin film on each other, thus suiting for use as materials of a thin film waveguide type SHG device.

The LiTaO$_3$ thin film, the LiNbO$_3$ thin film, and the LiNbO$_3$ substrate are preferably of single crystal.

This is because single crystal is superior in optical characteristics.

The reason why the LiNbO$_3$ thin film waveguide layer of the present invention must be formed on a LiTaO$_3$ thin film on a LiNbO$_3$ substrate can be explained as follows.

Since, in general, LiNbO$_3$ is superior in crystallinity to LiTaO$_3$, by forming a LiTaO$_3$ thin film on the LiNbO$_3$ substrate, the crystallinity of the LiNbO$_3$ substrate can be transferred to the LiTaO$_3$ thin film, thereby forming a LiTaO$_3$ thin film with a good crystallinity.

Therefore, by forming LiNbO$_3$ as a thin film waveguide layer on the LiTaO$_3$ thin film with good crystallinity, a thin film waveguide having superior characteristics in terms of light transmission, nonlinear optical effects and the like can be obtained, thereby obtaining a high-efficiency SHG output.

Furthermore, a carrier for the LiNbO$_3$ thin film can be obtained, which is more resistant to mechanical and thermal shocks than a flat plate-formed LiTaO$_3$ substrate.

It is preferable that the LiNbO$_3$ substrate is of an optical grade.

The optical-grade LiNbO$_3$ single crystal substrate refers to one which has a good crystallinity, contents of impurities such as iron of not more than 2 ppm, a refractive index distribution of not more than $10^{-4}$/cm (locally $\leq 10^{-5}$), and a raw material purity of 99.999% or higher.

The reason why the single crystal substrate is preferably of an optical grade is that, by forming a LiTaO$_3$ thin film on an optical-grade LiNbO$_3$ substrate, an optical-grade LiTaO$_3$ thin film can be obtained, and, by forming LiNbO$_3$ on the optical-grade LiTaO$_3$ thin film, the crystallinity of the LiTaO$_3$ thin film is transferred to the LiNbO$_3$, thereby obtaining a thin film waveguide layer with particularly enhanced light transmission, electro-optical effects, and non-linear optical effects.

The LiTaO$_3$ thin film preferably has a thickness of 0.2 to 30 $\mu m$.

This is because, when the thickness of the LiTaO$_3$ single crystal thin film is smaller than 0.2 $\mu m$, guided wave tends to leak, and, when the thin film is thicker than 30 $\mu m$, the crystallinity tends to be lowered.

It is particularly preferable that the LiTaO$_3$ thin film has a thickness of 0.5 to 10 $\mu m$, and a thickness of 1 to 5 $\mu m$ is advantageous.

It is preferable that the LiTaO$_3$ thin film and the LiNbO$_3$ substrate, and the LiTaO$_3$ thin film and the LiNbO$_3$ thin film waveguide layer in the present invention are individually lattice matched.

The lattice matching is to adjust the lattice constant of LiNbO$_3$ to 99.81 to 100.07% the lattice constant of LiTaO$_3$.

The reason why such lattice matching is preferable is that it allows formation of a thin film with no lattice deflection or micro-cracks.

In the present invention, lattice matching is advantageously achieved by adding a hetero element to the LiNbO$_3$ substrate or the LiNbO$_3$ thin film waveguide layer to increase the lattice constant, or, on the contrary, by adding a hetero element to the LiTaO$_3$ thin film to decrease the lattice constant.

The hetero element added to the LiNbO$_3$ thin film waveguide layer is preferably Na and Mg.

This is because Na and Mg atoms or ions have an effect to increase the lattice constant of LiNbO$_3$ by substitution or solid dissolution to LiNbO$_3$, and thus lattice matching between the LiNbO$_3$ substrate or thin film waveguide layer and the LiTaO$_3$ thin film can be achieved by adjusting the composition of Na and Mg.

Mg has an effect to prevent the thin film from being optically damaged, and use of it is advantageous to obtain a high-efficiency SHG output.

The contents of Na and Mg are preferably 0.1 to 14.3 mole % and 0.8 to 10.8 mole %, respectively, to LiNbO$_3$.

This is because, if the Na content is smaller than 0.1 mole %, lattice matching between the LiNbO$_3$ thin film and the LiTaO$_3$ thin film is not achieved regardless of the Mg content, and, if the Na content exceeds 14.3 mole %, the lattice constant tends to become too large. Thus, neither case gives lattice matching between the LiNbO$_3$ thin film and the LiTaO$_3$ thin film.

If the Mg content is smaller than 0.8 mole %, the effect to prevent optical damages tends to be insufficient, and, a Mg content exceeding 10.8 mole % tends to cause deposition of LiMgO$_3$-based crystals, thus such a high content of Mg cannot be added.

It is preferable to use Ti as the hetero element added to the LiTaO$_3$ thin film.

This is because Ti has an effect to decrease the lattice constant of LiTaO$_3$.

The Ti content is preferably 5.0 to 7.0 mole %.

This is because a Ti content out of the above range does not provide lattice matching to the LiNbO$_3$ substrate or waveguide layer.

Furthemore, it is preferable to form the LiNbO$_3$ thin film on the (0001) surface of the LiTaO$_3$ thin film.

The (0001) surface refers to the surface which is perpendicular to c-axis of the crystal.

The reason why the (0001) surface of the LiTaO$_3$ thin film is preferable as the growth surface of the LiNbO$_3$ thin film is that the (0001) surface comprises only a-axis, and thus lattice matching is achieved to the LiNbO$_3$ thin film by merely varying the lattice constant of the a-axis.

The lattice constant (a-axis) of the LiNbO$_3$ thin film formed on the LiTaO$_3$ thin film is preferably 99.81 to 100.07%, more preferably 99.92 to 100.03%, of the lattice constant (a-axis) of the LiTaO$_3$ thin film.

This is because, out of the above range, it is difficult to achieve lattice matching between the LiTaO$_3$ thin film and the LiNbO$_3$ thin film.

The LiNbO$_3$ thin film used in the SHG device according to the present invention preferably has propagation losses to a 0.83 μm semiconductor laser wave of not more than 1.4 dB/cm.

The propagation losses refer to a rate of decrease in light intensity per unit length in the direction of light transmitting in a thin film, which includes a scattering loss and an absorption loss.

The scattering loss depends on the condition of the interface between the substrate and thin film, surface condition of the thin film, and microcracks or the like in the thin film.

The absorption loss relates only to characteristics of the thin film, depending on the crystallinity, contents of impurities and the like of the thin film.

The SHG device according to the present invention is required to be used at a fundamental wavelength (λμm) of 0.68 to 0.94 μm.

Although it is advantageous to use a fundamental wavelength (λμm) of as short as possible, and, when the fundamental laser wavelength is shorter than 0.68 μm, the wavelength of the second harmonic wave is shorter than 0.34 μm, at wavelengths shorter than this value, absorption loss of the thin film tends to sharply increase, making it difficult to obtain a high SHG output. Furthermore, easily available semiconductor lasers include those of 0.68 to 0.94 μm, and of 1.2 to 1.55 μm, however, when the latter wavelength is used as a fundamental wavelength, the resulting second harmonic wavelength is in the range which can be relatively easily generated directly by a semiconductor laser, which does not provide an advantage of the use of a SHG device.

It is advantageous to use a fundamental wavelength (λ) of 0.78 to 0.86 μm, which is relatively easy to obtain a semiconductor laser light source, and it is practically preferable to use 0.82 to 0.84 μm, which is easy to obtain a high-output semiconductor laser source.

THE LiNbO$_3$ thin film waveguide layer of the SHG device according to the present invention is required to have a thickness (T) in the range from 0.1 to 20 μm.

If the thickness (T) of the thin film waveguide layer is smaller than 0.1 μm, it is difficult to apply the fundamental wave, resulting in a low incident efficiency, and it is difficult to obtain a substantially high SHG conversion efficiency, or a thickness greater than 20 μm results in a low optical power density and a low SHG conversion efficiency, either of which is difficult to use as a SHG device. It is advantageous for the thin film waveguide layer to have a thickness of 0.2 to 10 μm, and practically preferable to have a thickness of 0.4 to 8 μm.

The SHG device according to the present invention requires that the LiTaO$_3$ thin film has an ordinary refractive index ($n_{OS1}$) of 2.10 to 2.25 at a fundamental wavelength (λ), the LiNbO$_3$ thin film waveguide layer has an ordinary refractive index ($n_{OF1}$) of 2.22 to 2.38 at the fundamental wavelength (λ), the LiTaO$_3$ thin film has an extraordinary refractive index ($n_{eS2}$) of 2.22 to 2.38 at a second harmonic wavelength (λ/2), and the LiNbO$_3$ thin film waveguide layer has an extraordinary refractive index ($n_{eF2}$) of 2.24 to 2.42 at the second harmonic wavelength (λ/2).

Refractive indices out of the above ranges result in low conversion efficiencies to the second harmonic wave, which are impracticable.

The LiNbO$_3$ thin film waveguide layer and the LiTaO$_3$ thin film having the above refractive indices advantageously contain hetero element such as Na, Cr, Mg, Nd, Ti, and/or V to adjust the refractive indices.

The addition of Na, Cr, Nd, or Ti to the LiNbO$_3$ thin film waveguide layer and the LiTaO$_3$ thin film can increase the refractive indices of the LiNbO$_3$ thin film waveguide layer and the LiTaO$_3$ thin film, and the addition of Mg or V can decrease the refractive indices of the LiNbO$_3$ thin film waveguide layer and the LiTaO$_3$ thin film.

Na is preferably contained in an amount of 0.1 to 10 mole %. If the amount exceeds 10 mole %, crystals of different structures tend to deposit in the LiTaO$_3$ thin film, which deteriorate their optical characteristics, or if the amount is less than 0.1 mole %, the refractive indices are substantially unchanged, either of which cannot be used to obtain a practically usable SHG device. It is particularly preferable to contain Na in amounts of 0.8 to 2 mole %.

Cr is preferably contained in an amount of 0.02 to 20 mole %. If the amount exceeds 20 mole %, crystals of different structures tend to deposit in the LiNbO$_3$ thin film waveguide layer or the LiTaO$_3$ thin film, which deteriorate their optical characteristics, or if the amount is less than 0.1 mole %, the refractive indices are substantially unchanged, either of which cannot be used to obtain a practically usable SHG device. It is particularly preferable to contain Cr in amounts of 0.2 to 10 mole %.

Mg is preferably contained in an amount of 0.1 to 20 mole %. If the amount exceeds 20 mole %, crystals of different structures tend to deposit in the LiNbO$_3$ thin film waveguide layer or the LiTaO$_3$ thin film, which deteriorate their optical characteristics, or if the amount is less than 0.1 mole %, it has almost no effect to prevent optical damages, either of which cannot be used to obtain a practically usable SHG device. It is particularly preferable to contain Mg in amounts of 2.0 to 10 mole %. Ti is preferably contained in an amount of 0.2 to 30 mole %. If the amount exceeds 30 mole %, crystals of different structures tend to deposit in the LiNbO$_3$ thin film waveguide layer or the LiTaO$_3$ thin film, which deteriorate their optical characteristics, or if the amount is less than 0.2 mole %, the refractive indices are substantially unchanged, either of which cannot be used to obtain a practically usable SHG device. It is particularly preferable to contain Ti in amounts of 1.0 to 15 mole %.

Nd is preferably contained in an amount of 0.02 to 10 mole %. If the amount exceeds 10 mole %, crystals of different structures tend to deposit in the LiNbO$_3$ thin film waveguide layer or the LiTaO$_3$ thin film, which deteriorate their optical characteristics, or if the amount is less than 0.02 mole %, the refractive indices are substantially unchanged, either of which cannot be used to obtain a practically usable SHG device. It is particularly preferable to contain Nd in amounts of 0.5 to 5 mole %.

V is preferably contained in an amount of 0.05 to 30 mole %. If the amount exceeds 30 mole %, crystals of different structures tend to deposit in the LiNbO$_3$ thin film waveguide layer or the LiTaO$_3$ thin film, which deteriorate their optical characteristics, or if the amount is less than 0.05 mole %, the refractive indices are substantially unchanged, either of which cannot be used to obtain a practically usable SHG device. It is particularly preferable to contain V in amounts of 2.0 to 10 mole %.

The above contents are indicated in mole % of hetero elements to LiNbO$_3$ or LiTaO$_3$.

Since, when the hetero elements such as Na, Cr, Nd, Ti, Mg, or V are contained in the LiNbO$_3$ thin film waveguide layer, the lattice constant and refractive index of the LiNbO$_3$ are simultaneously varied, it is preferable to adjust the contents of the hetero elements as necessary.

In the present invention, the hetero elements such as Na, Cr, Mg, Nd, Ti, or V can be contained in the LiNbO$_3$ thin film waveguide layer, the LiTaO$_3$ thin film, or the LiNbO$_3$ substrate by previously mixing the raw materials with a hetero element or its compound and forming the LiTaO$_3$ thin film or the LiNbO$_3$ thin film waveguide layer using a liquid phase epitaxial method, by growing a LiNbO$_3$ single crystal using a Czochralski method, a sputtering method, a metal organic chemical vapor deposition (MOCVD) method, or a molecular beam epitaxial (MBE) method, a diffusion method, an ion implantation method or the like.

In the SHG device according to the present invention, it is preferable that the thickness (T$\mu$m) of the LiNbO$_3$ thin film waveguide layer, the ordinary refractive index ($n_{OF1}$) of the LiNbO$_3$ thin film waveguide layer at the fundamental wavelength ($\lambda\mu$m), the extraordinary refractive index ($n_{eS2}$) of the LiTaO$_3$ thin film at the second harmonic wavelength ($\lambda\mu$m/2), and the extraordinary refractive index ($n_{eF2}$) of the LiNbO$_3$ thin film waveguide layer at the second harmonic wavelength ($\lambda\mu$m/2) satisfy the equation $$0.01 \leq \frac{(n_{eF2} - n_{eS2})}{T(n_{OF1} - n_{eS2})} \leq 1.1$$

This is because in the SHG device comprising a LiNbO$_3$ thin film waveguide layer formed on a LiTaO$_3$ thin film, if the structure is such that the above equation is not satisfied, a low conversion efficiency to the second harmonic wave will result.

To obtain a particularly high conversion efficiency, it is advantageous to satisfy the equation $$0.1 \leq \frac{(n_{eF2} - n_{eS2})}{T(n_{OF1} - n_{eS2})} \leq 0.6$$

more preferably, to satisfy the equation $$0.2 \leq \frac{(n_{eF2} - n_{eS2})}{T(n_{OF1} - n_{eS2})} \leq 0.3$$

In the SHG device according to the present invention, it is preferable that incident angle ($\theta$) of the fundamental wave to the optical axis (Z-axis) of the thin film waveguide layer is within the range $0°\pm15°$ or $90°\pm15°$.

This is because, when the incident angle ($\theta$) of the fundamental wave is within the above range, the conversion efficiency to the second harmonic is extremely high. It is particularly advantageous that the incident angle of the fundamental wave is within the range $0°\pm5°$ or $90°\pm5°$.

The SHG device according to the present invention is advantageously of a channel type with a width of 1 to 10 $\mu$m. The reason why a channel-type SHG device is advantageous is that this type of device can have a high optical power density over a slab type. The reason why a width of 1 to 10 $\mu$m is advantageous is that a width smaller than 1 $\mu$m is difficult to introduce incident light into the waveguide and low in incident efficiency, resulting in a low SHG conversion efficiency, and, although the larger width has the higher incident efficiency, a width greater than 10 $\mu$m is low in optical power density, resulting in a low SHG conversion efficiency.

The LiNbO$_3$ substrate, the LiNbO$_3$ thin film waveguide layer, and the LiTaO$_3$ thin film used in the present invention can have surfaces which are treated by mirror polishing, chemical etching, or the like.

The SHG device according to the present invention preferably has a wavelength-selective thin film (filter) formed behind the light output surface or directly on the output surface, which has a second harmonic wave transmittance of 100% or close to 100%, and completely or almost does not pass the fundamental laser wave.

This can remove unnecessary fundamental laser light from the output wave and efficiently take out only the required second harmonic wave.

Furthermore, by forming the wavelength-selective thin film directly on the output surface and adjusting to satisfy the reflection reducing conditions to the second harmonic wave, reflection loss at the output surface due to a large difference in refractive index between the lithium niobate single crystal thin film layer and air can be reduced, thereby enhancing the SHG output.

The wavelength-selective thin film may be either formed at a position behind and away from the output surface or fixed onto the output surface with an appropriate adhesive.

When the thin film is fixed onto the output surface with an adhesive, it is preferable that the refractive index and thickness of the adhesive be adjusted to meet the reflection reducing conditions for the second harmonic wave in order to enhance the SHG output.

As the wavelength-selective thin film can be used as a colored glass filter, a wavelength-selective interference film coated on a glass substrate, or the like.

The wavelength-selective thin film can be made of an oxide such as $SiO_2$, MgO, ZnO, $Al_2O_3$ or the like, a complex oxide such as $LiNbO_3$, $LiTaO_3$, $Y_3Ga_5O_{12}$, $Gd_3Ga_5O_{12}$ or the like, or such organic substances as PMMA and MNA, or a multilayered thin film comprising these materials can be used.

The wavelength-selective thin film can be formed by a sputtering, liquid phase epitaxial, deposition, MBE (molecular beam epitaxial), MOCVD (metal organic chemical deposition), ion plating, LB, spin coating, or dipping method.

The SHG device according to the present invention preferably has an incident surface which is provided with an reflection reducing coating to achieve a fundamental laser transmittance of 100% or close to 100%.

The reflection reducing coating can be made of such oxides as $SiO_2$, MgO, ZnO, and $Al_2O_3$, such complex oxides as $LiNbO_3$, $LiTaO_3$, $Y_3Ga_5O_{12}$, and $Gd_3Ga_5O_{12}$, or such organic substances as PMMA and MNA, or a multilayered thin film comprising these materials can be used. The coating layer can be formed to good advantage by a sputtering, liquid phase epitaxial, deposition, MBE (molecular beam epitaxial), MOCVD (metal organic chemical deposition), ion plating, LB, spin coating, or dipping method.

Furthermore, the SHG device according to the present invention preferably has a wavelength-selective thin film formed on the incident surface, which has a fundamental laser light transmittance of 100% or close to 100%, and completely or almost does not pass light ranging from 0.6 μm to less than fundamental wavelength.

This is because semiconductor lasers generally emit weak laser light or natural light of peripheral wavelengths other than the central wavelength, and light of these wavelengths is normally unnecessary for the SHG device.

The SHG device according to the present invention is desirably coupled with a semiconductor laser device into a single chip and sealed in a package, so that the laser wave is applied to the thin film waveguide layer of the SHG device.

This is because by coupling with the semiconductor device, a semiconductor laser device can be obtained which is compact, low-cost, adaptable to mass production, and has a high incident efficiency, and, by the packaging, the coupled semiconductor laser device can be protected, extending the service life.

The inside of the package is desirably filled with an insert gas, preferably with nitrogen gas.

A second harmonic wave outputting window of the package is desirably formed with a wavelength-selective filter.

This simplifies the process, and provides a cost reduction and improvement of transmittance to the second harmonic wave, over the case where the second harmonic wave outputting window is formed by a conventional glass plate and the wavelength-selective filter is formed inside or outside of the glass plate.

The method for producing the SHG device according to the present invention will now be described.

The SHG device according to the present invention is necessary to be produced by the following processes (a) and (b). Process (a): a $LiNbO_3$ thin film is formed on a $LiTaO_3$ substrate, and a fundamental laser wavelength (λμm), an ordinary refractive index ($n_{OS1}$) of the $LiTaO_3$ substrate at the fundamental wavelength (λμm), an ordinary refractive index ($n_{OF1}$) of the $LiNbO_3$ thin film at the fundamental wavelength (λμm), an extraordinary refractive index ($n_{eS2}$) of the $LiTaO_3$ substrate at a second harmonic wavelength (λμm/2), and an extraordinary refractive index ($n_{eF2}$) of the $LiNbO_3$ thin film at the second harmonic wavelength (λμm/2) are individually adjusted within the following specific values:

λ = 0.68 to 0.94 μm
$n_{OF1}$ = 2.22 to 2.38
$n_{OS1}$ = 2.10 to 2.25
$n_{eF2}$ = 2.24 to 2.42
$n_{eS2}$ = 2.22 to 2.38

Process (b): the $LiNbO_3$ thin film is dry etched to a thickness (Tμm) of 0.1 to 20 μm.

Such processes are necessary because the thickness (Tμm) of the $LiNbO_3$ can be adjusted without deteriorating the crystallinity of the etched surface, thereby improving the SHG conversion efficiency.

The refractive index is advantageously adjusted by adding hetero elements such as Na, Cr, Mg, Nd, Ti, and V.

The addition of Na, Cr, Nd, or Ti to the $LiNbO_3$ thin film waveguide layer and the $LiTaO_3$ thin film can increase the refractive indices of the $LiNbO_3$ thin film waveguide layer and the $LiTaO_3$ thin film, and, the addition of Mg or V can decrease the refractive indices of the $LiNbO_3$ thin film waveguide layer and the $LiTaO_3$ thin film.

Na is preferably contained in an amount of 0.1 to 10 mole %. If the content exceeds 10 mole %, crystals of different structures tend to deposit in the $LiTaO_3$ thin film, which deteriorate their optical characteristics, or if the amount is less than 0.1 mole %, the refractive indices are substantially unchanged, either of which cannot be used to obtain a practically usable SHG device. It is particularly preferably to contain Na in amounts of 0.8 to 2 mole %.

Cr is preferably contained in an amount of 0.02 to 20 mole %. If the content exceeds 20 mole %, crystals of different structures tend to deposit in the $LiNbO_3$ thin film waveguide layer or the $LiTaO_3$ thin film, which deteriorate their optical characteristics, or if the amount is less than 0.1 mole %, the refractive indices are substantially unchanged, either of which cannot be used to obtain a practically usable SHG device. It is particularly preferable to contain Cr in amounts of 0.2 to 10 mole %.

Mg is preferably contained in an amount of 0.1 to 20 mole %. If the content exceeds 20 mole %, crystals of different structures tend to deposit in the $LiNbO_3$ thin film waveguide layer or the $LiTaO_3$ thin film, which deteriorate their optical characteristics, or if the amount is less than 0.1 mole %, it has almost no effect to prevent optical damages, either of which cannot be used to obtain a practically usable SHG device. It is particularly preferable to contain Mg in amounts of 2.0 to 10 mole %. Ti is preferably contained in an amount of 0.2 to 30 mole %. If the content exceeds 30 mole %, crystals of different structures tend to deposit in the LiNbO$_3$ thin film waveguide layer or the LiTaO$_3$ thin film, which deteriorate their optical characteristics, or if the amount is less than 0.2 mole %, the refractive indices are substantially unchanged, either of which cannot be used to obtain a practically usable SHG device. It is particularly preferable to contain Ti in amounts of 1.0 to 15 mole %.

Nd is preferably contained in an amount of 0.02 to 10 mole %. If the content exceeds 10 mole %, crystals of different structures tend to deposit in the LiNbO$_3$ thin film waveguide layer or the LiTaO$_3$ thin film, which deteriorate their optical characteristics, or if the amount is less than 0.02 mole %, the refractive indices are substantially unchanged, either of which cannot be used to obtain a practically usable SHG device. It is particularly preferable to contain Nd in amounts of 0.5 to 5 mole %.

V is preferably contained in an amount of 0.05 to 30 mole %. If the content exceeds 30 mole %, crystals of different structures tend to deposit in the LiNbO$_3$ thin film waveguide layer or the LiTaO$_3$ thin film, which deteriorate their optical characteristics, or if the amount is less than 0.05 mole %, the refractive indices are substantially unchanged, either of which cannot be used to obtain a practically usable SHG device. It is particularly preferable to contain V in amounts of 2.0 to 10 mole %.

The above contents are indicated in mole % of hetero elements to LiNbO$_3$ or LiTaO$_3$.

Dry etching techniques used in the present invention include ion beam etching, reactive ion etching, sputter etching, plasma etching, and reactive ion beam etching, and the ion beam etching is particularly preferable.

The ion beam etching uses a plasma generated a filament or ECR (electron cyclotron resonance), which is irradiated as an ion beam to etch a material to be processed.

The ion beam etching not only is able to reduce the etching rate to 0.01 to 0.001 μm/hr, but also has a good repeatability, provides a uniform etching rate over a large area, and gives almost no damages to the material being processed.

It is required that the tolerance of the film thickness (Tμm) be ±0.01 to ±0.05 μm, and the ion beam etching is the most suitable as a processing method which allows such high-precision processing and does not deteriorate the optical characteristics of the thin film waveguide layer.

The LiTaO$_3$ substrate is desirably a LiTaO$_3$ thin film formed on a LiNbO$_3$ substrate.

Furthermore, the thickness (Tμm) of the LiTaO$_3$ thin film, the ordinary refractive index ($n_{OF1}$) of the LiNbO$_3$ thin film at the fundamental wavelength (λμm), the extraordinary refractive index ($n_{eS2}$) of the LiTaO$_3$ thin film at the second harmonic wavelength (λμm/2), and the extraordinary refractive index ($n_{eF2}$) of the LiNbO$_3$ thin film at the second harmonic wavelength (λμm/2) are preferably represented by the following Equation (a):

$$0.01 \leq \frac{(n_{eF2} - n_{eS2})}{T(n_{OF1} - n_{eS2})} \leq 1.1 \quad (a)$$

This is because when the above Equation (a) is satisfied, the SHG is high in conversion efficiency and practical.

The above-described channel-type SHG device can be produced by forming the LiNbO$_3$ thin film on the LiTaO$_3$ by sputtering, liquid phase epitaxy or the like, and then forming a Ti waveguide pattern on top of the thin film waveguide layer by photolithography and RF sputtering, which can be used as an etching mask in ion beam etching to form a step, then the etching mask is removed, and ion beam etching is made again to adjust the thickness (Tμm) of the LiNbO$_3$ thin film to 0.1 to 20 μm.

If the thickness (T) of the thin film waveguide layer is smaller than 0.1 μm, it is difficult to apply the fundamental wave, resulting in a low incident efficiency, and it is difficult to obtain a substantially high SHG conversion efficiency, or a thickness greater than 20 μm results in a low optical power density and a low SHG conversion efficiency, either of which is difficult to use as a SHG device. It is advantageous for the thin film waveguide layer to have a thickness of 0.2 to 10 μm, and practically preferable to have a thickness of 0.4 to 8 μm.

The reason why, after the step is provided by the above production method, the film thickness is adjusted to the SHG oscillation condition is explained as follows:

It is generally difficult to precisely measure the thickness of a thin film on a substrate, and even with an electron microscope, a measurement error is inevitably involved.

However, when a step is provided on the substrate and actually measured, and the ratio in thickness of the step and the thin film waveguide layer can be calculated using an electron microscope to precisely determine the thickness.

Thus, the thickness of the LiNbO$_3$ thin film can be precisely adjusted to a predetermined thickness.

The reason why the etching mask comprising a Ti thin film is preferable is that Ti can be formed by ordinary RF sputtering into a uniform, smooth thin film with a good repeatability of thickness, can be easily etched with a chemical etching solution which does not corrode ordinary photolithographic resists, etching rate is low with ion beam etching, and can thus be stably used as an ion beam etching mask.

Figure 1:
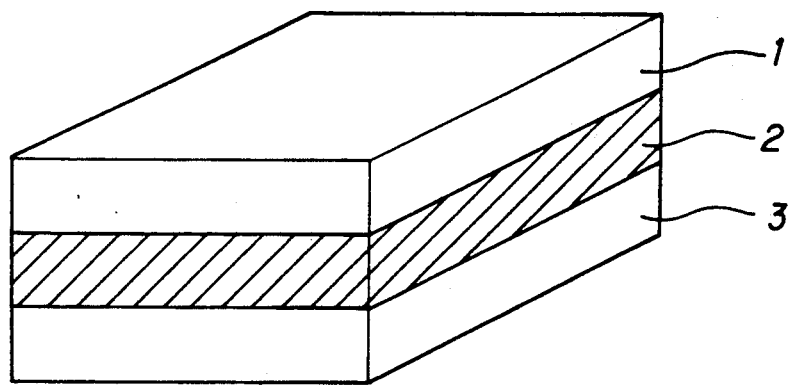
FIG. 1 is a schematic perspective view of the second harmonic wave generating device comprising a slab-type waveguide as an embodiment of the present invention
Figure 2:
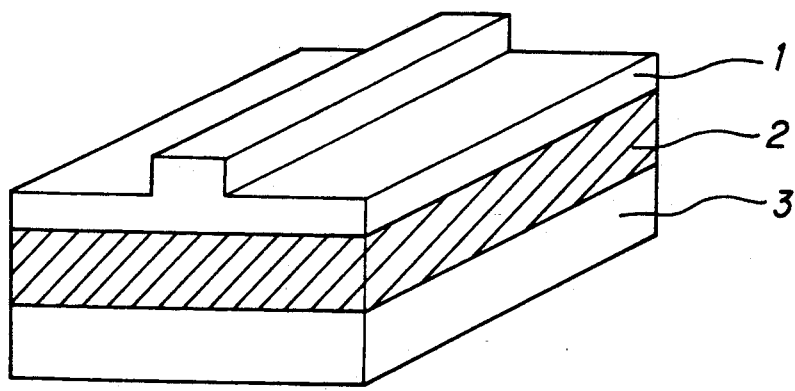
FIG. 2 is a schematic perspective view of the second harmonic wave generating device comprising a channel-type waveguide.

In the drawings, numeral 1 indicates a LiNbO$_3$ thin film waveguide layer, numeral 2 indicates a LiTaO$_3$ thin film, and numeral 3 indicates a LiNbO$_3$ substrate.

DESCRIPTION OF THE PREFERRED EMBODIMENTS

Examples of the present invention will now be described.

EXAMPLE 1

(1) Using a RF sputtering method, a LiTaO$_3$ single crystal thin film of 5 μm in thickness was formed on a 0.5-mm thick optical-grade Z-cut LiNbO$_3$ single crystal substrate.

(2) Using a liquid phase epitaxial growth method, a Mg(5mole %)-containing LiNbO$_3$ single crystal thin film of 5 μm in thickness was grown on the LiTaO$_3$ single crystal thin film obtained in (1).

(3) The surface of the LiNbO$_3$ single crystal thin film obtained in (2) was mirror-polished to form a slab-type waveguide using the LiNbO$_3$ single crystal thin film as a waveguide layer.

(4) The thickness of the waveguide (3) was adjusted by ion beam etching to a phase matching thickness of 2.01±0.03 μm.

(5) Both end surfaces of the slab-type waveguide obtained in (4) were mirror-polished by buffing to allow incidence of light through the surfaces, obtaining a second harmonic wave generating (SHG) device.

For a fundamental wavelength λ of 0.832 μm, the ordinary refractive index ($n_{OS1}$) of the LiTaO$_3$ thin film was 2.1511, the ordinary refractive index ($n_{OF1}$) of the LiNbO$_3$ single crystal thin film waveguide layer was 2.2594, the extraordinary refractive index ($n_{eS2}$) of the LiTaO$_3$ single crystal thin film at the second harmonic wavelength λ/2 was 2.2511, and the extraordinary refractive index ($n_{eF2}$) of the LiNbO$_3$ single crystal thin film waveguide layer at λ/2 was 2.2531.

This SHG device corresponds to $$\frac{(n_{eF2} - n_{eS2})}{T(n_{OF1} - n_{eS2})} = 0.12$$

To the SHG device, a 40 mW semiconductor laser of 0.832 μm in wavelength was applied with an incident angle of 90° to the crystal axis (Z-axis) of the single crystal thin film. As a result, the SHG device exhibited a very high SHG conversion efficiency of 1.87%.

EXAMPLE 2

(1) Using a RF sputtering method, a LiTaO$_3$ single crystal thin film of 8 μm in thickness was formed on a 0.5-mm thick optical-grade Z-cut LiNbO$_3$ single crystal substrate.

(2) Using a liquid phase epitaxial growth method, a Nd(1 mole %)-containing LiNbO$_3$ single crystal thin film of 5 μm in thickness was grown on the LiTaO$_3$ single crystal thin film obtained in (1).

(3) The surface of the LiNbO$_3$ single crystal thin film obtained in (2) was mirror-polished to form a slab-type waveguide using the LiNbO$_3$ single crystal thin film as a waveguide layer.

(4) The thickness of the waveguide (3) was adjusted by ion beam etching to a phase matching thickness of 3.97±0.04 μm.

(5) Both end surfaces of the slab-type waveguide obtained in (4) were mirror-polished by buffing to allow incidence of light through the surfaces, obtaining a second harmonic wave generating (SHG) device.

For a fundamental wavelength λ of 0.902 μm, the ordinary refractive index ($n_{OS1}$) of the LiTaO$_3$ thin film was 2.1461, the ordinary refractive index ($n_{OF1}$) of the Nd-containing LiNbO$_3$ thin film waveguide layer was 2.261, the extraordinary refractive index ($n_{eS2}$) of the LiTaO$_3$ single crystal thin film at the second harmonic wavelength λ/2 was 2.2561, and the extraordinary refractive index ($n_{eF2}$) of the Nd-containing LiNbO$_3$ thin film waveguide layer was 2.2601.

This SHG device corresponds to $$\frac{(n_{eF2} - n_{eS2})}{T(n_{OF1} - n_{eS2})} = 0.168$$

To the SHG device, a 40 mW semiconductor laser of 0.902 μm in wavelength was applied with an incident angle of 90° to the crystal axis (Z-axis) of the single crystal thin film. As a result, the SHG device exhibited a very high SHG conversion efficiency of 1.95%.

EXAMPLE 3

(1) Using a RF sputtering method, a LiTaO$_3$ single crystal thin film of 5 μm in thickness was formed on a 0.5-mm thick optical-grade Z-cut LiNbO$_3$ single crystal substrate.

(2) Using a liquid phase epitaxial growth method, a Mg/Na(5 and 1 mole %)-containing LiNbO$_3$ single crystal thin film of 5 μm in thickness was grown on the LiTaO$_3$ single crystal thin film obtained in (1).

(3) The surface of the LiNbO$_3$ single crystal thin film obtained in (2) was mirror-polished to form a slab-type waveguide using the LiNbO$_3$ single crystal thin film as a waveguide layer.

(4) The thickness of the waveguide (3) was adjusted by ion beam etching to a phase matching thickness of 3.95±0.03 μm.

(5) The slab type waveguide obtained in (3) and (4) was processed by photolithography to form a ridge-type channel waveguide with a width of 10 μm, a thickness of 3.95±0.03 μm, and a step size of 1.5 μm.

(6) Both end surfaces of the channel-type waveguide obtained in (5) were mirror-polished by buffing to allow incidence of light through the surfaces, obtaining a second harmonic wave generating (SHG) device.

For a fundamental wavelength λ of 0.780 μm, the ordinary refractive index ($n_{OS1}$) of the LiTaO$_3$ thin film was 2.1549, the ordinary refractive index ($n_{OF1}$) of of the Mg/Na-containing LiNbO$_3$ thin film waveguide layer was 2.2685, the extraordinary refractive index ($n_{eS2}$) of the LiTaO$_3$ single crystal thin film at the second harmonic wavelength λ/2 was 2.2628 and the extraordinary refractive index ($n_{eF2}$) of the Mg/Na-containing LiNbO$_3$ thin film waveguide layer was 2.2670.

This SHG device corresponds to $$\frac{(n_{eF2} - n_{eS2})}{T(n_{OF1} - n_{eS2})} = 0.187$$

To the SHG device, a 40 mW semiconductor laser of 0.78 μm in wavelength was applied with an incident angle of 90° to the crystal axis (Z-axis) of the single crystal thin film. As a result, the SHG device exhibited a very high SHG conversion efficiency of 4.83%.

EXAMPLE 4

This example is basically similar to Example 1, except for wavelength-selective filters (having a 98% transmittance of laser light at 415-nm wavelength light and a 1% transmittance of laser light at 830-nm wavelengtht) comprising 590 angstroms thick SiO$_2$ formed by RF sputtering at both ends of the waveguide.

This SHG device was also measured for SHG conversion efficiency as in Example 1. As a result, the SHG device exhibited a very high SHG conversion efficiency of 1.99%.

EXAMPLE 5

This example is basically similar to Example 1, except that various types of herero elements were contained in the $LiTaO_3$ thin film and the $LiNbO_3$ thin film waveguide layer to adjust the refractive indices. These SHG devices were also measured for refractive index and SHG conversion efficiency. The results are shown in Table 1.

As described above, the present invention can provide a thin film waveguide type second harmonic wave generating device having a high SHG conversion efficiency, using an easily available $LiNbO_3$ single crystal substrate.

TABLE 1

| LiTaO₃ | LiNbO₃ Cr 10 mole % | Ni 5 mole % | V 8 mole % | Ti 5 mole % |
|---|---|---|---|---|
| 11 mole % Cr diffused layer 1,000 angstroms | | | 2.1513 2.2669 2.2612 2.2650 1.75% | |
| 9 mole % Ni diffused layer 250 angstroms | 2.1513 2.2672 2.2612 2.2652 1.80% | | | |
| 9 mole % V diffused layer 550 angstroms | | 2.1509 2.2671 2.2607 2.2652 1.80% | | 2.1510 2.2672 2.2609 2.2653 1.80% |
| 5 mole % Ti diffused layer 850 angstroms | | | 2.1511 2.2671 2.2610 2.2652 1.79% | |

Note: Figures individually indicate from the top:
no S 1
no F 1
ne S 2
ne F 2
Conversion efficiency.

We claim:

1. A second harmonic wave generating device comprising a $LiTaO_3$ thin film formed on a $LiNbO_3$ substrate and a $LiNbO_3$ thin film waveguide layer formed on said $LiTaO_3$ thin film, a fundamental laser wavelength ($\lambda\mu m$), a thickness ($T\mu m$) of said $LiNbO_3$ thin film waveguide layer, an ordinary refractive index ($n_{OS1}$) of said $LiTaO_3$ thin film at the fundamental wavelength ($\lambda\mu m$), an ordinary refractive index ($n_{OF1}$) of said $LiNbO_3$ thin film waveguide layer at the fundamental wavelength ($\lambda\mu m$), an extraordinary refractive index ($n_{eS2}$) of said $LiTaO_3$ thin film at a second harmonic wavelength ($\lambda\mu m/2$), and an extraordinary refractive index ($n_{eF2}$) of said $LiNbO_3$ thin film waveguide layer at the second harmonic wavelength ($\lambda\mu m/2$) being individually within the following specific values:
$\lambda = 0.68$ to $0.94$ $\mu m$
$T = 0.1$ to $20$ $\mu m$
$n_{OF1} = 2.22$ to $2.38$
$n_{OS1} = 2.10$ to $2.25$
$n_{eF2} = 2.24$ to $2.42$
$n_{eS2} = 2.22$ to $2.38$.

2. The second harmonic wave generating device of claim 1 wherein the thickness ($T\mu m$) of said $LiNbO_3$ thin film waveguide layer, the ordinary refractive index ($n_{OF1}$) of said $LiNbO_3$ thin film waveguide layer at the fundamental wavelength ($\lambda\mu m$), the extraordinary refractive index ($n_{eS2}$) of said $LiTaO_3$ thin film at the second harmonic wavelength ($\lambda\mu m/2$), and the extraordinary refractive index ($n_{eF2}$) of said $LiNbO_3$ thin film waveguide layer at the second harmonic wavelength ($\lambda\mu m/2$) are represented by Equation ($\alpha$)

$$0.01 \leq \frac{(n_{eF2} - n_{eS2})}{T(n_{OF1} - n_{eS2})} \leq 1.1. \quad (\alpha)$$

3. The second harmonic wave generating device of claim 1 wherein incident angle ($\theta$) of said fundamental wave to the optical axis (Z-axis) of said thin film waveguide layer is $0° \pm 15°$ or $90° \pm 15°$.

4. The second harmonic wave generating device of claim 1 wherein said $LiNbO_3$ substrate is an optical-grade single crystal.

5. The second harmonic wave generating device of claim 1 wherein said fundamental wavelength ($\lambda\mu m$) is 0.78 to 0.86 $\mu m$.

6. The second harmonic wave generating device of claim 1 wherein said $LiNbO_3$ thin film waveguide layer has a thickness of 0.4 to 8 $\mu m$.

7. The second harmonic wave generating device of claim 1 wherein said $LiTaO_3$ thin film has a thickness of 0.2 to 30 $\mu m$.

8. The second harmonic wave generating device of claim 1 wherein said $LiNbO_3$ waveguide layer contains at least one element selected from the group consisting of Na, Cr, Mg, Ni, Ti, and V.

9. The second harmonic wave generating device of claim 1 wherein said $LiTaO_3$ thin film contains at least one element selected from the group consisting of Na, Cr, Mg, Ni, Ti, and V.

10. The second harmonic wave generating device of claim 1 of a channel type having a width of 1 to 10 $\mu m$.

11. The second harmonic wave generating device of claim 1 further comprising a wavelength-selective filter formed at the output side.

12. The second harmonic wave generating device of claim 11 wherein said wavelength-selective filter is formed directly on a second harmonic wave outputting end surface.

* * * * *